(12) United States Patent
Aftanas et al.

(10) Patent No.: US 6,338,427 B1
(45) Date of Patent: Jan. 15, 2002

(54) MULTI-POSITION, ARTICULATING VEHICLE ARTICLE CARRIER APPARATUS AND METHOD

(75) Inventors: Jeffrey M. Aftanas, Ortonville; Donald R. Potter, Clarkston, both of MI (US)

(73) Assignee: JAC Products, Inc., Ann Arbor, MI (US)

( * ) Notice: Subject to any disclaimer, the term of this patent is extended or adjusted under 35 U.S.C. 154(b) by 0 days.

(21) Appl. No.: 09/528,765

(22) Filed: Mar. 17, 2000

(51) Int. Cl.$^7$ ............................................. B60R 9/042
(52) U.S. Cl. ..................... 224/310; 224/492; 224/309; 414/462
(58) Field of Search ................................ 224/484, 492, 224/309, 310, 320, 321; 414/462

(56) References Cited

U.S. PATENT DOCUMENTS

| | | | |
|---|---|---|---|
| 2,833,453 A | | 5/1958 | Barreca |
| 2,888,178 A | | 5/1959 | Olson |
| 3,193,124 A | * | 7/1965 | Essling .................. 224/310 X |
| 3,531,006 A | | 9/1970 | Farchmin |
| 3,720,358 A | | 3/1973 | McIntire |
| 3,777,922 A | | 12/1973 | Kirchmeyer |
| 3,963,136 A | | 6/1976 | Spanke |
| 4,007,862 A | | 2/1977 | Heftmann |
| 4,101,061 A | | 7/1978 | Sage et al. |
| 4,219,142 A | | 8/1980 | Macpherson |
| 4,223,689 A | | 9/1980 | Cox |
| 4,240,571 A | | 12/1980 | Ernst |
| 4,291,823 A | | 9/1981 | Freeman et al. |
| 4,294,388 A | | 10/1981 | Wunstel |
| 4,350,471 A | | 9/1982 | Lehmann |
| 4,406,384 A | | 9/1983 | Schantz |
| 4,682,719 A | | 7/1987 | Ernst et al. |
| 4,705,198 A | | 11/1987 | Kamaya |
| 4,757,929 A | | 7/1988 | Nelson |
| 4,809,943 A | | 3/1989 | Taschero |

(List continued on next page.)

FOREIGN PATENT DOCUMENTS

| | | | | |
|---|---|---|---|---|
| DE | 25 51 646 A1 | | 6/1977 | |
| DE | 33 13 267 C2 | | 1/1991 | |
| DE | 4112190 A | * | 10/1992 | .................. 224/310 |
| EP | 101054 | * | 2/1984 | .................. 224/310 |
| FR | 2596344 | * | 9/1983 | .................. 224/310 |
| JP | 152643 | * | 9/1983 | .................. 224/310 |

*Primary Examiner*—Gregory M. Vidovich
(74) *Attorney, Agent, or Firm*—Harness, Dickey & Pierce, PLC

(57) ABSTRACT

A multi-position, articulating, vehicle article carrier apparatus for use with various types of vehicles such as sport utility vehicles, station wagons, minivans, etc. The apparatus includes a pair of side rails which are adapted to be fixedly secured to a roof portion of a vehicle. A pair of articulating mechanisms allow a cargo supporting structure coupled thereto to be disposed over a liftgate of the vehicle and secured to latching assemblies mounted in a rear bumper of the vehicle. The articulating mechanisms maintain the cargo supporting structure fixedly secured against movement when the cargo supporting structure is in a lowered position over the liftgate. When the cargo supporting structure is lifted into an intermediate position, each of the articulating mechanisms automatically unlock, thus allowing the entire cargo supporting structure to be urged into a position over the roof of the vehicle. Upper locking assemblies allow the cargo supporting structure to be secured fixedly on top of the vehicle. Unlocking of the cargo supporting structure from either the bumper or the upper locking assemblies is accomplished by a user grasping and rotating an actuator rod assembly which allows lower locking assemblies at opposite lower ends of the cargo supporting structure to be unlocked simultaneously. Cargo can be supported with the cargo supporting structure in the lowered position over the liftgate or on top of the roof of the vehicle.

27 Claims, 10 Drawing Sheets

U.S. PATENT DOCUMENTS

| | | |
|---|---|---|
| 4,887,750 A | 12/1989 | Dainty |
| 4,995,538 A | 2/1991 | Marengo |
| 5,058,791 A * | 10/1991 | Henriquez et al. .......... 224/310 |
| 5,115,955 A | 5/1992 | Dallaire et al. |
| 5,226,570 A | 7/1993 | Pedrini |
| 5,350,145 A | 9/1994 | Fabbri Corsarini |
| 5,397,042 A | 3/1995 | Pedrini |
| 5,417,358 A * | 5/1995 | Haselgrove ................ 224/310 |
| 5,449,100 A | 9/1995 | Eckhart |
| 5,460,304 A | 10/1995 | Porter et al. |
| 5,560,525 A | 10/1996 | Grohmann et al. |
| 5,673,965 A | 10/1997 | Lenkens |
| 5,690,259 A * | 11/1997 | Montani ..................... 224/310 |
| 5,715,980 A | 2/1998 | Blankenburg et al. |
| 5,884,824 A * | 3/1999 | Spring, Jr. .................. 224/310 |
| 6,015,074 A | 1/2000 | Snavely et al. |

\* cited by examiner

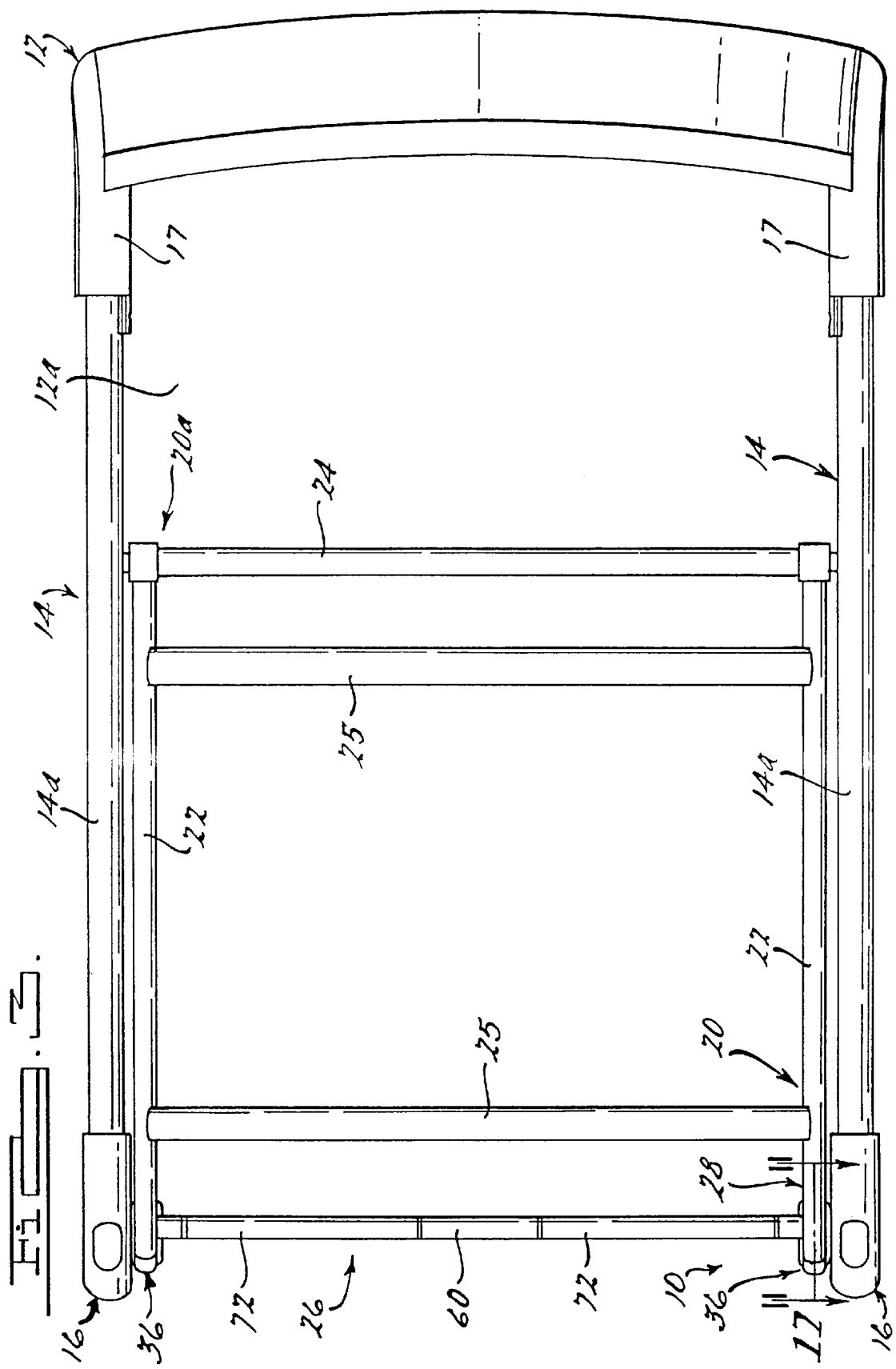

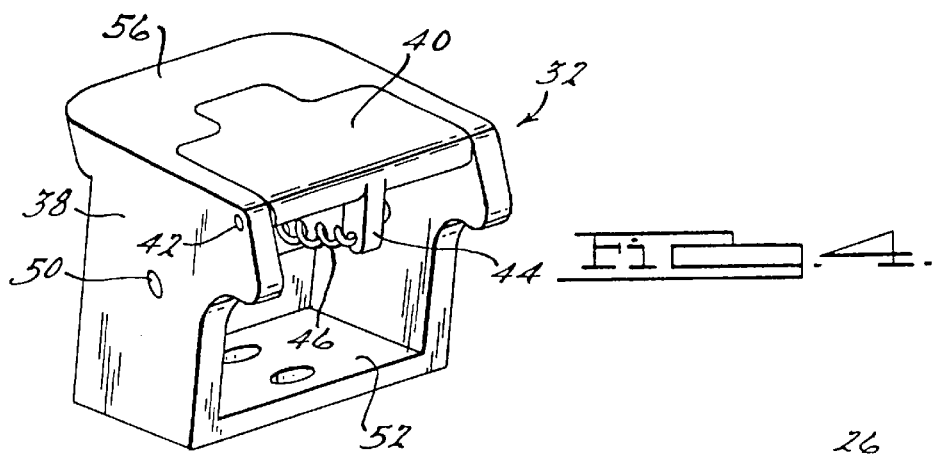
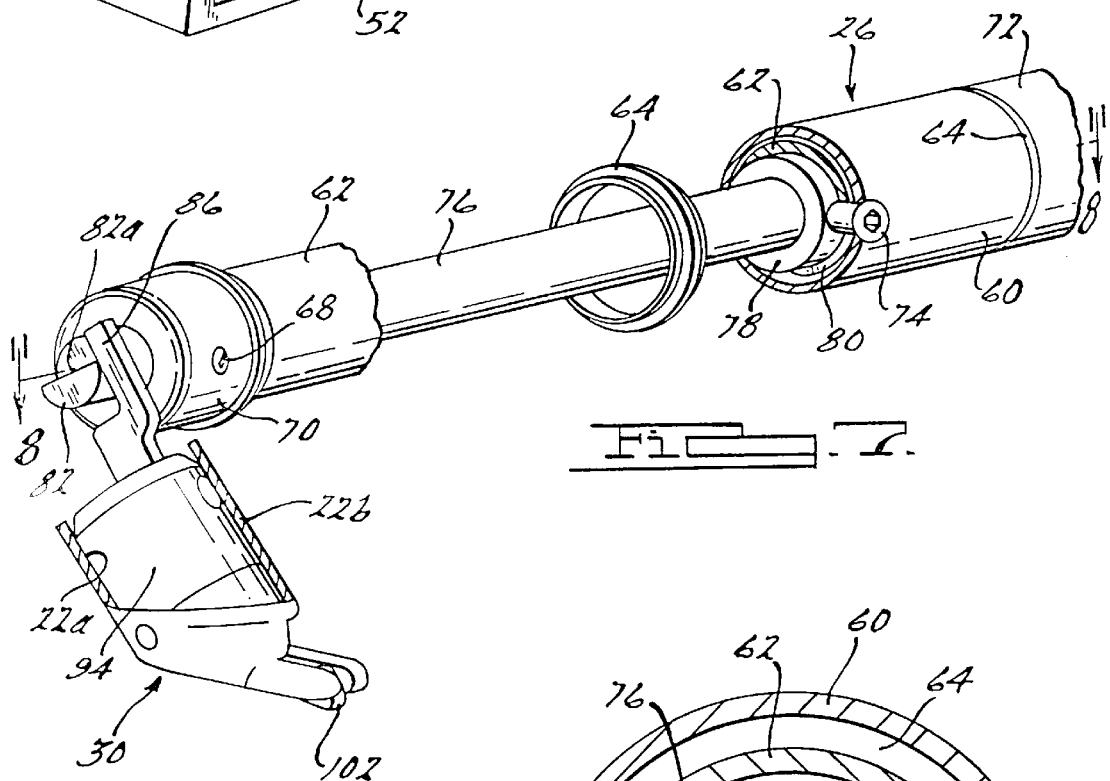
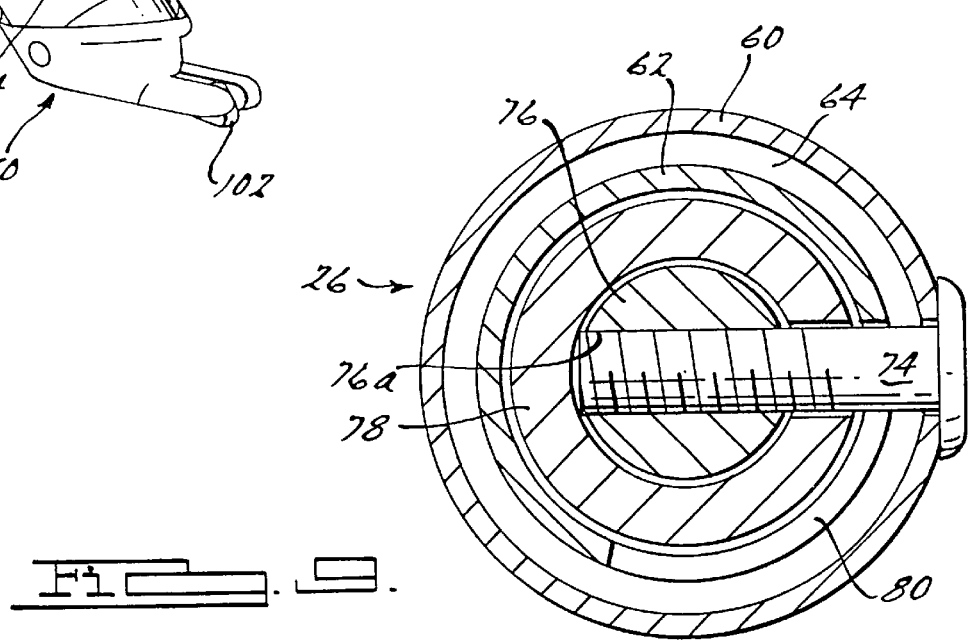

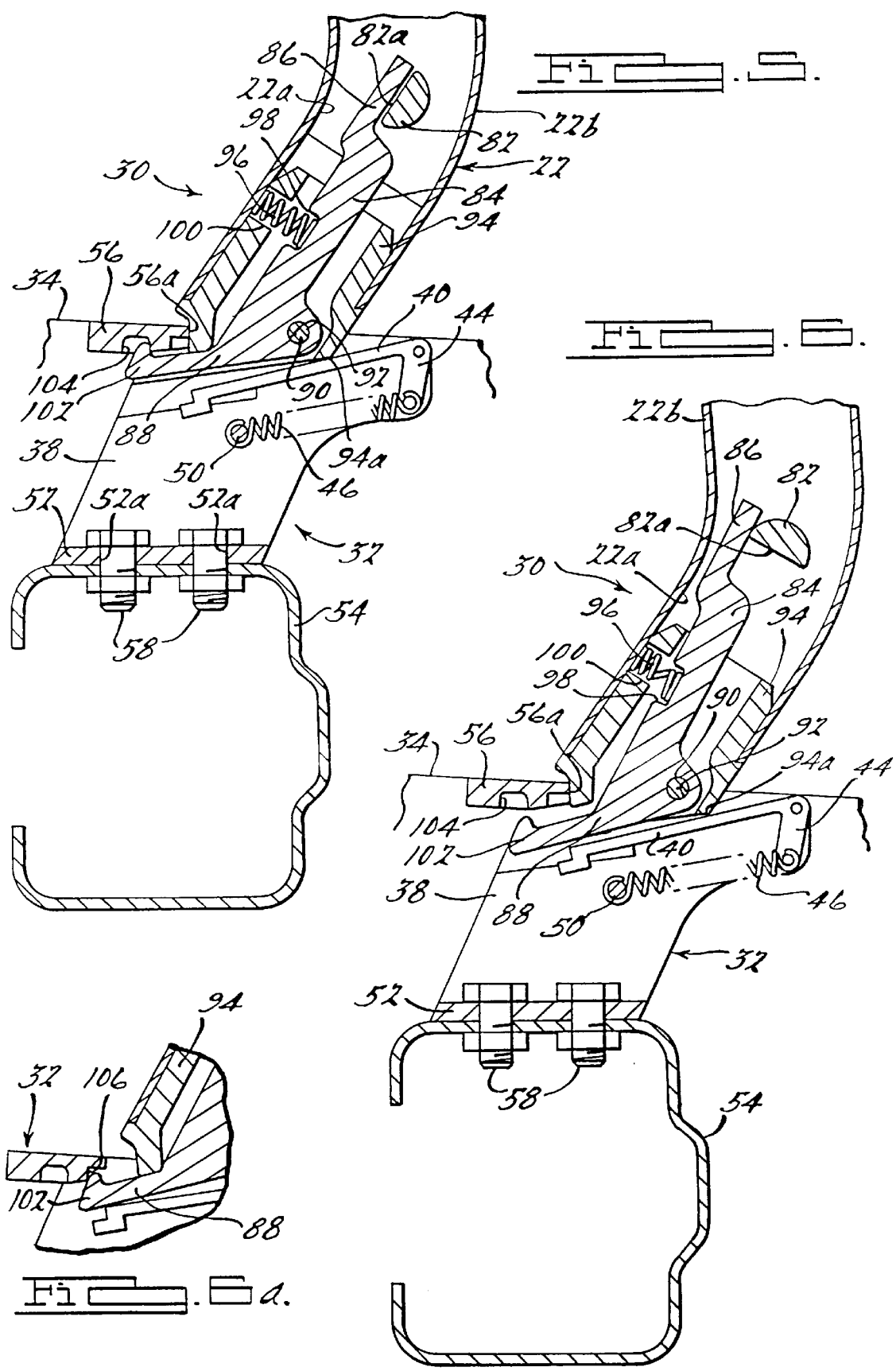

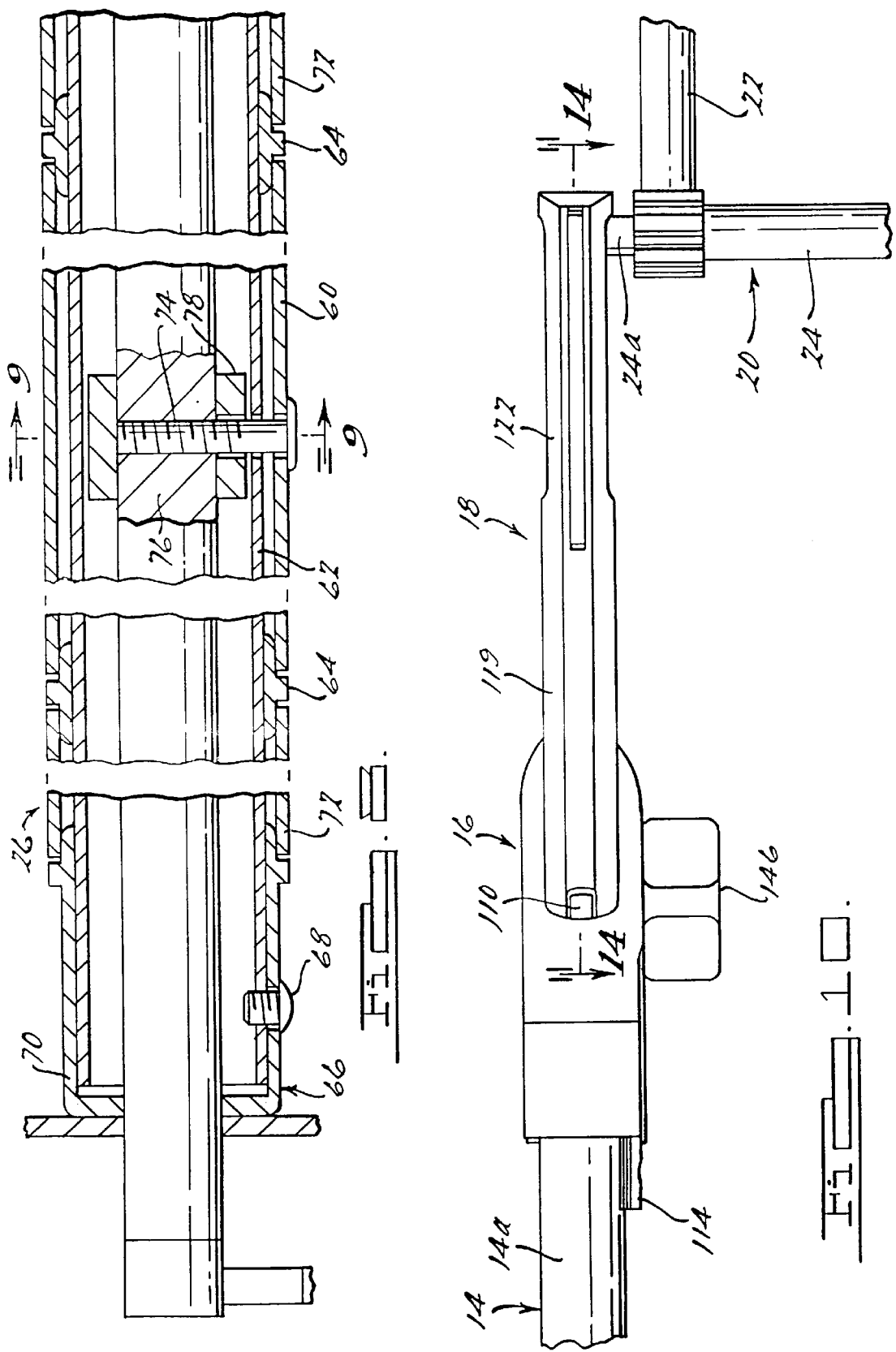

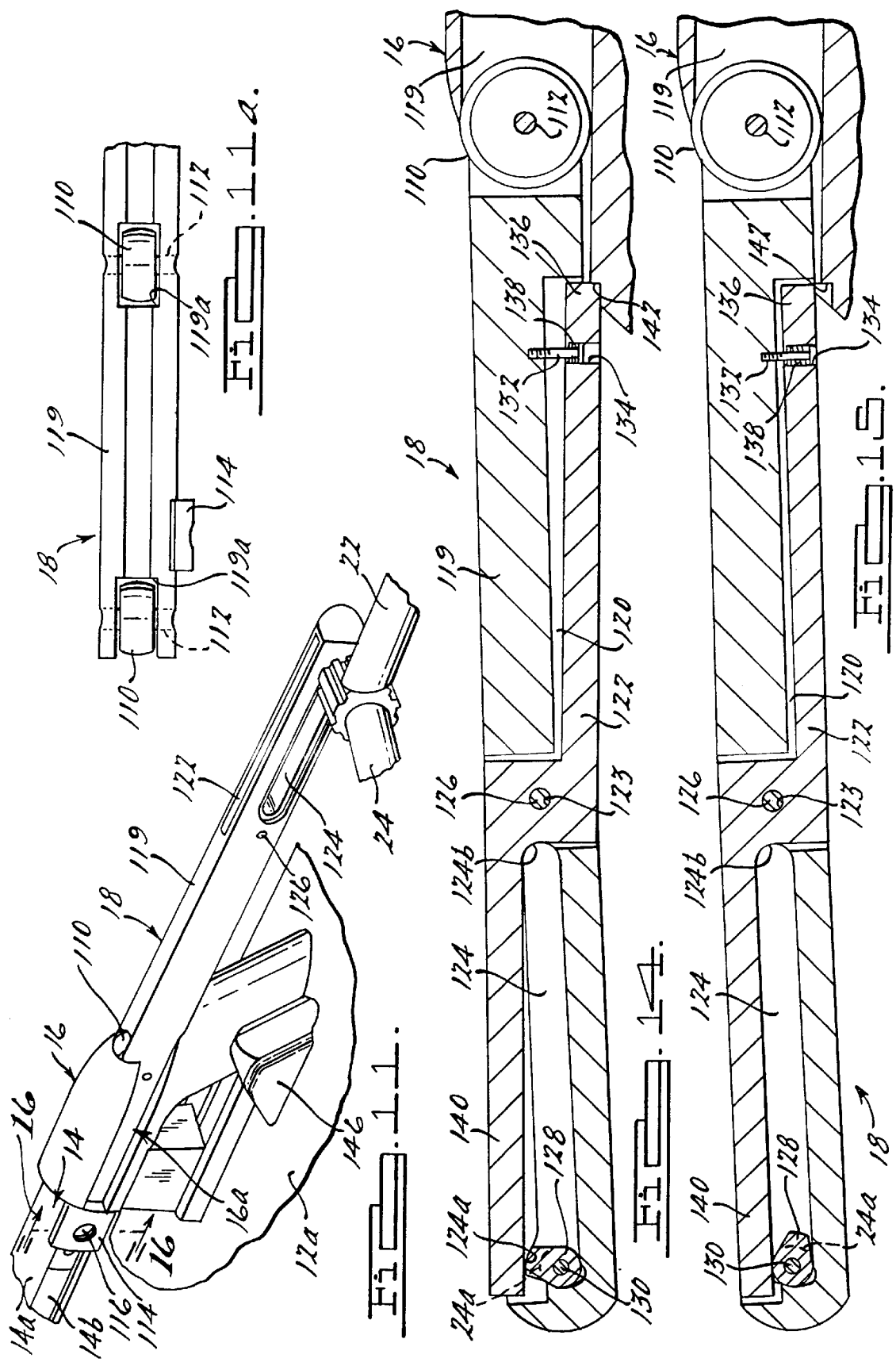

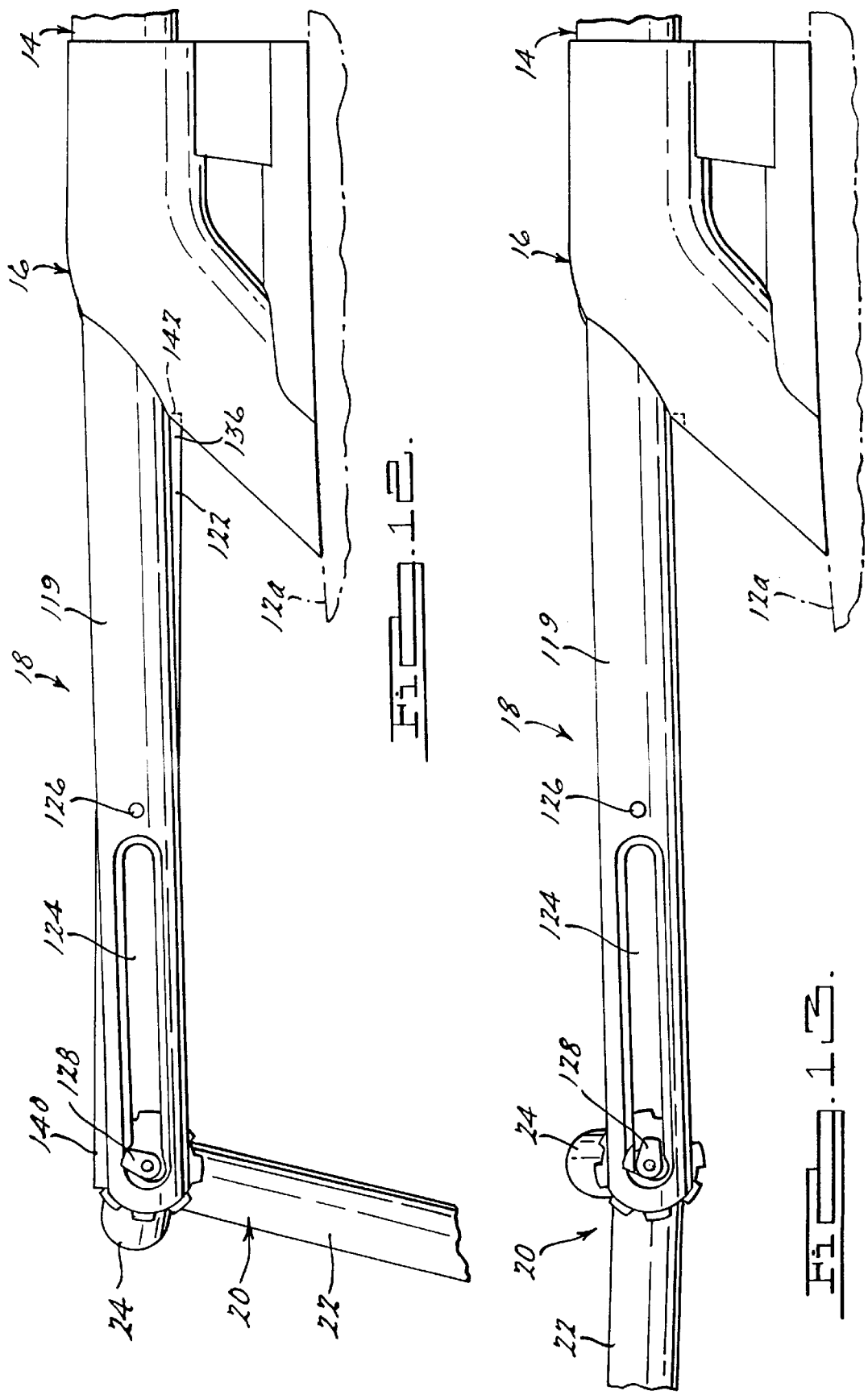

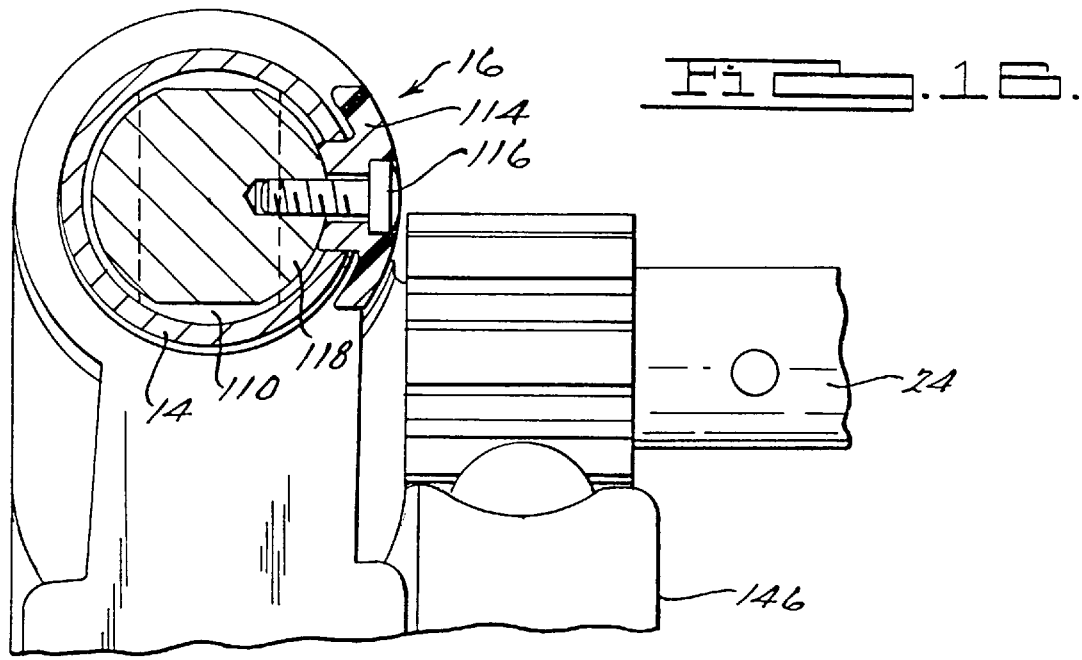
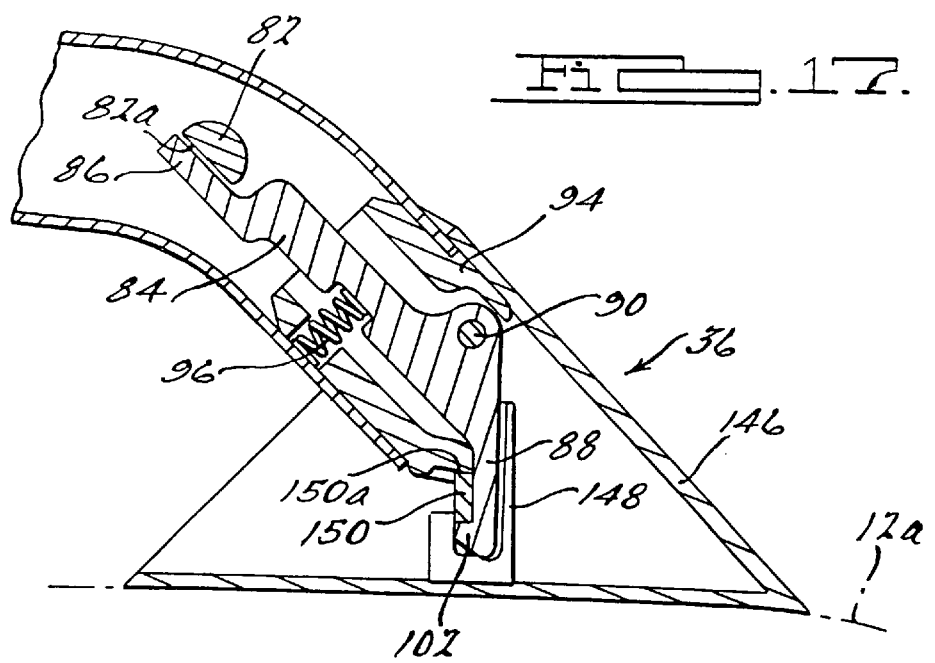

MULTI-POSITION, ARTICULATING VEHICLE ARTICLE CARRIER APPARATUS AND METHOD

BACKGROUND OF THE INVENTION

1. Technical Field

This invention relates to vehicle article carrier systems, and more particularly to a multi-position vehicle article carrier system having a cargo supporting structure capable of being secured over a liftgate of a vehicle and moved into a second position over a roof portion of the vehicle once cargo is loaded onto the cargo supporting structure.

2. Discussion

Vehicle article carriers are used in a wide variety of vehicles to support cargo and various other articles above an outer body surface, such as a roof portion, of a vehicle. Typically, such systems include a pair of side rails or slats which are fixedly secured to the roof portion of the vehicle. Usually a pair of cross bars are secured to the side rails or slats to extend transversely therebetween. The cargo is then positioned on the cross bars and secured down via suitable securing straps or bungee cords so that the cargo is held securely on the article carrier while the vehicle is in use.

One drawback with any conventional vehicle article carrier system is the occasional difficulty of lifting cargo and other articles to be transported up onto the roof portion of the vehicle. This is particularly so if the vehicle is a sport utility vehicle or a mini van, in which case the roof thereof is often at a height which is higher than many individuals can reach easily when attempting to lift cargo onto the article carrier. Removing cargo from the vehicle article carrier can often be just as difficult depending, of course, on the specific cargo, its dimensions and its weight.

Some attempts have been made to overcome this problem by providing a vehicle article carrier which has some form of movable load supporting structure which can be disposed in a temporary position in which cargo can be more easily loaded thereunto. Such systems, for example, are illustrated in U.S. Pat. Nos. 5,649,655; 5,505,579 and 5,417,358.

The systems illustrated in the above-mentioned patents typically suffer from one or more drawbacks. Often, such systems are complex to manufacture, and therefore costly. With some such devices, they cannot be left in a "lowered" position, but rather must be maintained in a retracted position on top of the vehicle roof. Some also do not allow for convenient opening of the liftgate of a vehicle when the cargo supporting portion is in its lowered position.

In view of the foregoing, it is a principal object of the present invention to provide a vehicle article carrier having a cargo supporting structure which can be articulated between a first position, wherein the cargo supporting structure extends down alongside a portion of the vehicle, such as over the liftgate of the vehicle, and a second position in which the cargo supporting structure is supported over the roof of the vehicle.

It is another object of the present invention to provide a vehicle article carrier having a cargo supporting structure which can be articulated between a first position wherein it extends over the liftgate of a vehicle, and a second position in which it extends generally parallel outwardly from the roof of the vehicle, and therefore enables opening and closing of the liftgate without interference from the cargo supporting portion, and further without the need for the cargo supporting portion to be fully positioned over the vehicle roof before the liftgate can be opened.

It is still another object of the present invention to provide a multi-position vehicle article carrier in which a cargo supporting structure is used to support cargo in either a first position over the liftgate of a vehicle, or a second position on top of the vehicle, and wherein the vehicle article carrier includes a locking mechanism preventing movement of the cargo supporting structure until this structure is articulated into an intermediate position, whereupon the locking mechanism is automatically unlocked to allow the entire cargo supporting structure to be slid over the roof of the vehicle and secured over the roof.

It is still another object of the present invention to provide an article carrier system having a cargo supporting structure which can be secured over a liftgate of a vehicle, and which further includes a manually rotatable actuating rod which allows the cargo supporting structure to be unlocked at both of its lower corners, simultaneously, with a single turn of the actuating rod.

SUMMARY OF THE INVENTION

The above and other objects are provided by a multi-position, articulating, vehicle article carrier apparatus and method. In one embodiment the apparatus includes a pair of side rails adapted to be fixedly disposed on a roof portion of a vehicle such as a station wagon, sport utility vehicle (SUV) or minivan. The side rails each include channels for receiving articulating assemblies which are slidably disposed on the side rails. Pivotally secured to the articulating assemblies is a cargo supporting structure. The cargo supporting structure includes at least one, but preferably a pair, of cross bars for supporting cargo thereon. The cargo supporting structure may be secured at its free end to a portion of the vehicle such as the bumper or even portions of the vehicle body extending alongside the liftgate.

The cargo supporting structure includes an actuator bar assembly disposed adjacent to its free end which may be grasped with one hand by an individual and turned. This simultaneously unlocks at least one, but preferably a pair, of locking mechanisms which otherwise secure the free end of the cargo supporting structure to the bumper or vehicle body. Once unlocked, the cargo supporting structure can be lifted upwardly to an intermediate position extending generally parallel to the roof portion of the vehicle. Once in this position, a camming mechanism associated with the articulating assembly automatically unlocks the articulating assembly such that the entire articulating assembly and cargo supporting structure can be moved slidably along the side rails onto the roof portion of the vehicle. Once disposed over the roof portion, the free end of the cargo supporting structure can be secured to a pair of locking assemblies associated with each of the side rails.

It is an advantage of the vehicle article carrier of the present invention that the end of the cargo supporting structure pivotally secured to the articulating assemblies is locked against movement until the entire cargo supporting structure is lifted into the intermediate position, whereupon automatic unlocking of the articulating assemblies occurs. Thus, the cargo supporting structure is held fixedly in a very stable position whether it is disposed over the liftgate of the vehicle (i.e., in a "lowered" position) or on top of the vehicle. Accordingly, cargo can be loaded and supported on the cargo supporting structure not only while the structure is disposed on top of the vehicle, but while the cargo supporting structure is disposed in its lowered position over the liftgate. Being able to load and unload cargo while the cargo supporting structure is in its lowered position adds significantly to the ease in loading and unloading cargo from the article carrier.

It is also an important advantage of the present invention that the article carrier thereof does not interfere with opening and closing of the liftgate once the cargo supporting structure is unlocked from the bumper or body portion of the vehicle. Thus, access can be gained to the interior of the vehicle through the liftgate quickly and easily, and even while cargo is secured to the cargo supporting structure. All that is required is for the user to manually rotate the actuator bar assembly to unlock the free end of a cargo supporting structure from the bumper or body of the vehicle, lift the cargo supporting structure into the intermediate position and then slide it forwardly over the roof of the vehicle.

The multi-position, articulating, vehicle article carrier of the present invention thus provides an easy and convenient means of loading cargo onto a portion of the article carrier and transporting the cargo either over the liftgate of the vehicle or on top of the vehicle. The cargo supporting structure of the vehicle article carrier is further lightweight, easily articulated by a single person, and provides significant added ease in loading, positioning and unloading cargo onto and off of the vehicle article carrier.

BRIEF DESCRIPTION OF THE DRAWINGS

The various advantages of the present invention will become apparent to one skilled in the art by reading the following specification and subjoined claims and by referencing the following drawings in which;

FIG. 3 is a plan view of the apparatus of FIG. 1 showing the apparatus in a second position in which a cargo supporting structure thereof is disposed over the roof portion of the vehicle;

FIG. 4 is a perspective view of one of the latching assemblies secured to a support beam on the rear bumper of the vehicle of FIG. 1;

FIG. 5 is a cross sectional side view of the free end of the cargo supporting structure secured to the latching assembly, taken in accordance with section line 5—5 in FIG. 1;

FIG. 6 is a cross sectional side view of the latching assembly of FIG. 5 with the lower locking assembly of the cargo supporting structure unlatched therefrom and ready to be lifted away from the bumper;

FIG. 6a is a fragmentary side, cross-sectional view of the latching lever of FIG. 5 engaging the latching assembly as the latching lever is urged into the latching assembly;

FIG. 7 is a perspective fragmentary view of a portion of the torque rod assembly of the cargo supporting structure illustrating one of the lower locking assemblies at one end of the torque rod assembly;

FIG. 8 is a cross sectional view of a portion of the torque rod assembly shown in FIG. 7 taken in accordance with section line 8—8 in FIG. 7;

FIG. 9 is a cross sectional view of the torque rod assembly taken in accordance with section line 9—9 in FIG. 8;

FIG. 10 is a plan view of the rear portion of one of the side rails also showing the articulating assembly and a small portion of the cargo supporting structure;

FIG. 11 is a perspective view of the articulating assembly and the rearmost end portion of one of the side rails;

FIG. 11a is a plan view of an end portion of the articulating assembly illustrating the pair of rollers that are used for enabling rolling movement of the articulating assembly along its associated side rail;

FIG. 12 is a side view of the articulating assembly when the cargo supporting structure is disposed in the lowered position shown in FIG. 1;

FIG. 13 is a side view of the articulating assembly when the cargo supporting structure is moved into the intermediate position shown in FIG. 2;

FIG. 14 is a cross sectional side view of the articulating assembly in accordance with section line 14—14 in FIG. 10, when the cargo supporting structure is in the lowered position of FIG. 1;

FIG. 15 is a cross sectional side view of the articulating assembly of FIG. 14 with the cargo supporting structure raised into the intermediate position of FIG. 2;

FIG. 16 is a partial cross sectional view of the side rail taken in accordance with section line 16—16 in FIG. 11;

FIG. 17 is a cross sectional side view of the upper locking assembly of one of the rear supports, taken in accordance with section line 17—17 in FIG. 3;

DETAILED DESCRIPTION OF THE PREFERRED EMBODIMENTS

Figure 1:
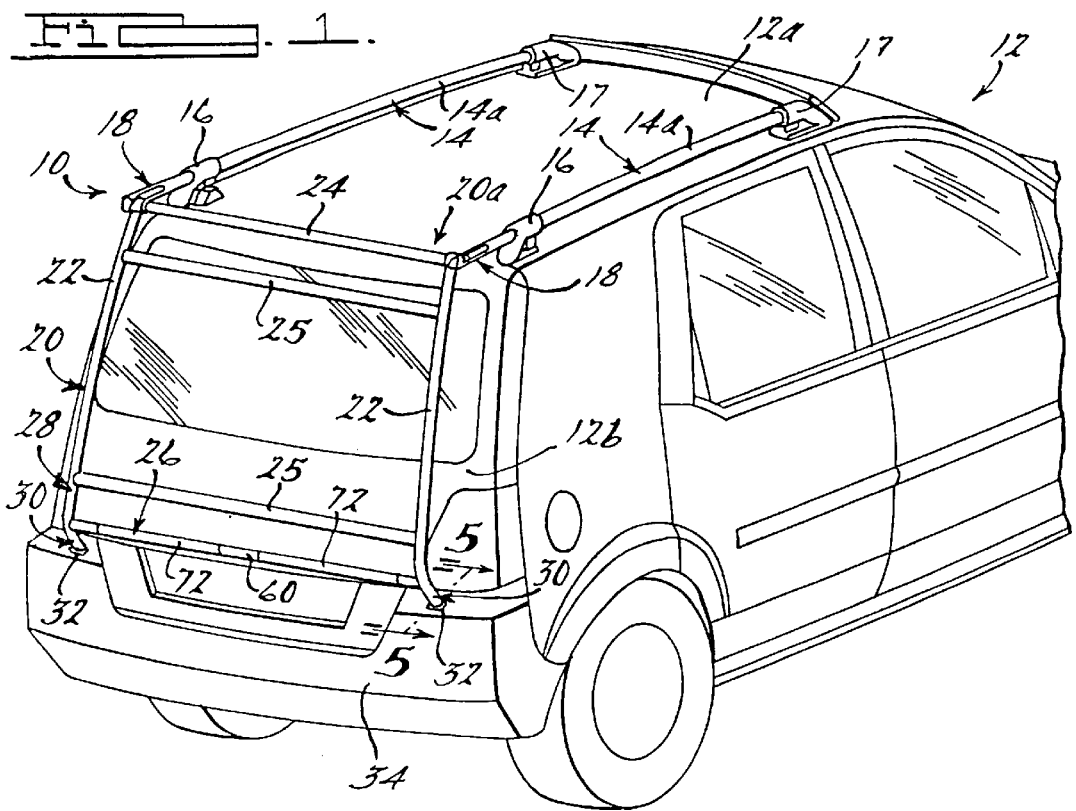
FIG. 1 is a perspective view of a rear portion of a vehicle illustrating a preferred embodiment of a multi-position, articulating, article carrier apparatus in accordance with the present invention secured to the outer body surface of the vehicle, with the apparatus in a first or lowered position.

Referring to FIG. 1 there is shown a multi-position, articulating, vehicle article carrier apparatus 10 in accordance with a preferred embodiment of the present invention. The apparatus 10 is shown secured to a roof portion 12a of a motor vehicle 12. While the motor vehicle 12 is illustrated as a sport utility vehicle (SUV), it will be appreciated that the apparatus 10 could also be used with minivans, station wagons, and a wide variety of other vehicles, and is therefore not limited to use with any particular type of vehicle.

The apparatus 10 includes a pair of side rails 14 which are adapted to be fixedly secured to the roof portion 12a of the vehicle 12. Each side rail 14 includes a rear support 16 and a front support 17 which support a main portion 14a of the side rail 14 above the roof portion 12a. Each of the main portions 14a of each side rail 14 comprise C-shaped channels.

A pair of articulating mechanisms 18 are engaged with the side rails 14 so as to be movable along each of the side rails 14. The articulating mechanisms 18 are pivotably secured to a cargo supporting structure 20. The cargo supporting structure 20 includes a frame comprised of side members 22, a transversely extending top frame member 24 and an actuator bar assembly 26. At least one cross bar 25, and more preferably a pair of cross bars 25, are disposed on the cargo supporting structure 20 to extend between the side members 22. The cross bars 25 may be fixedly secured to the side members 22 or clamping assemblies or other means may be employed to permit adjustable positioning of the cross bars 25 along the side members 22. Securing straps such as bungee cords may be used to secure cargo on the cross bars 25.

A lower or free end 28 of the cargo supporting structure 20 includes a pair of lower locking assemblies 30. These lower locking assemblies 30 are each adapted to latch with a corresponding pair of latching assemblies 32 disposed within a rear bumper 34 of the vehicle 12.

Figure 2:
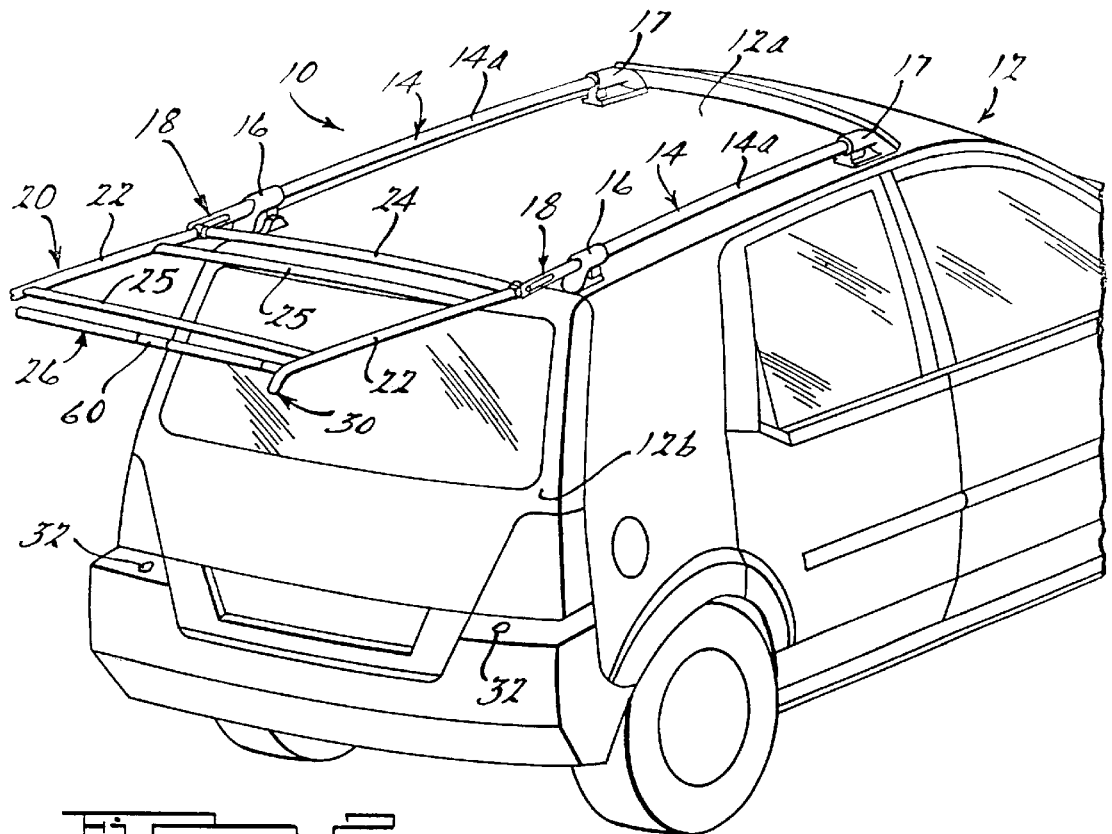
FIG. 2 is a view of the apparatus and vehicle shown in FIG. 1 with the apparatus disposed in an intermediate position about to be urged over a roof portion of the vehicle.

Referring to FIGS. 1–3, the apparatus 10 can be secured in a first or lowered position disposed over a liftgate 12b, as shown in FIG. 1. In this position cargo can be carried on the cargo supporting structure 20 through the use of suitable fastening straps or bungee cords or like components which secure the cargo to the cross bars 25. In FIG. 2, the cargo supporting structure 20 is shown after same has been raised into an intermediate position. This is accomplished by a user actuating the actuator bar assembly 26 to release the lower locking assemblies 30 from the latching assemblies 32, and then lifting upwardly on the free end 28 of the cargo supporting structure 20. FIG. 3 shows the cargo supporting structure 20 after same has been slid forwardly over the roof portion 12a of the vehicle 12. In this position the lower locking assemblies 30 can be locked to a corresponding pair of upper locking assemblies 36 associated with the two rear supports 16.

Referring now to FIGS. 4 and 5, one of the latching assemblies 32 is shown. The latching assembly 32 includes a main body portion 38 and a latching door 40 pivotably secured by a pivot pin 42 to the main body portion 38. The latching door 40 includes a lower end 44 which is biased by a spring 46 secured to a transversely extending pin 50. Thus, the latching door 40 is constantly biased into the closed position shown in FIG. 4. A base portion 52 allows the main body portion 38 to be secured to a structural frame member 54 disposed within the bumper 34. The base portion 52 is preferably secured to the structural member 54 by a plurality of threaded fastening members 58 extending through apertures 52a in the base portion 52. An upper wall 56 of the main body portion 38 sits generally flush with an upper outer surface of the bumper 34 to present an aesthetically pleasing appearance whether or not the cargo supporting structure 20 is in the lowered position shown in FIG. 1.

Referring now to FIGS. 7–9, the actuator bar assembly 26 will be described. Referring specifically to FIGS. 7 and 8, the actuator bar assembly 26 includes a centrally disposed, manually graspable and rotatable member 60. Rotatable member 60 is disposed over a first sleeve portion 62 and supported by a pair of support rings 64 which are also disposed over the first sleeve 62. The first sleeve 62 extends completely to each opposite end 66 of the actuator bar assembly 26 and is secured by at least one fastening member 68 within an end cap portion 70. A free wheeling sleeve 72 is disposed on each side of the rotatable sleeve 60 in between one of the supports 64 and one of the end cap portions 70. The free wheeling sleeve 72 rotates freely while being grasped when the free end 28 of the cargo supporting structure 20 is lifted from the lowered position of FIG. 1 into the intermediate position of FIG. 2.

With further reference to FIGS. 8 and 9, the rotatable sleeve 60 is secured to a torque rod 76 via a threaded member 74 which extends into a threaded bore 76a in the torque rod 76. A spacer sleeve 78 (also shown in FIG. 7) also receives the threaded member 74 therethrough. The first sleeve 62 includes a slot 80 extending over an arc of slightly greater than 90°. Slot 80 permits the rotatable sleeve 60 and the threaded member 74 to be rotated without interference from the first sleeve 62. Thus, when the rotatable sleeve 60 is rotated, this rotational movement is transmitted to the torque rod 76.

With specific reference to FIG. 7, each opposite end of the torque rod 76 includes a half moon shaped protrusion 82 which forms a camming surface 82a. Camming surface 82a is used to control locking and unlocking of its associated lower locking assembly 30, which will be described momentarily. It will thus be appreciated that the actuator bar assembly 26 allows an unlocking action to be effected which releases the two lower locking assemblies 30 simultaneously from their respective latching assemblies 32 simply through a short twisting motion of the rotatable sleeve 60. Thus, unlocking of the actuator rod assembly 26 from the lower locking assemblies 32 can be effected with only one hand of a user and with a simple, short and convenient rotational movement of the rotatable sleeve 60.

Referring now to FIGS. 5–7, the construction and operation of one of the pair of lower locking assemblies 30 will be described. Each lower locking assembly 30 includes a latching lever 84 having an upper end 86 and a lower end 88. The latching lever 84 is pivotally mounted via a pivot pin 90 which extends through an aperture 92 in the lever 84 and also through a main body portion 94 which partially encloses the latching lever 84.

With specific reference to FIG. 5, a spring 96 is disposed against an inside surface 22a of a tubular portion 22b of the side member 22, and extends through an opening 100 in the main body portion 94 into a notch 98 formed in the latching lever 84. The spring 96 biases the lower end 88 of the latching lever 84 upwardly into a closed or latched position, which is shown in FIG. 5.

With reference to FIGS. 5, 6 and 7, when the rotatable sleeve 60 is grasped with one hand and rotated, the camming surface 82a of the protrusion 82 rotates to urge the upper end 86 of the latching lever 84 pivotally about the pivot pin 90. As the latching lever 84 rotates, the lower end 88 thereof is drawn away from the upper wall 56 of the latching assembly 32 (FIG. 6). This allows a lip portion 102 of the latching lever 84 to be drawn out of a notch 104 formed in an undersurface of the upper wall 56. While the rotatable sleeve 60 is held in the rotated position, the user lifts the free end 28 of the cargo supporting structure 20 upwardly and away from the latching assembly 32.

When the free end 28 of the cargo supporting structure 20 is lowered into latching engagement with the latching assemblies 32, no rotational movement of the rotatable sleeve 60 is required for proper latching of the lower locking assemblies 30 to occur. As the lower end 88 of each latching lever 88 contacts its respective latching door 40, an edge portion 94a of the main body portion 94 engages the latching door 40 and urges this component downwardly into the position shown in FIGS. 5 and 6. Referring to FIG. 6a, further lowering movement of the cargo supporting structure 22 causes the lip portion 102 to engage an interior edge 106 of the upper wall 56. Further lowering movement causes the lip 102 to ride over the interior edge 106 before snapping into engagement in the notch 104 (FIG. 5).

Referring now to FIGS. 10–15, the construction and operation of the articulating mechanisms 18 will be described. With initial reference to FIGS. 10, 11 and 11a, each articulating mechanism 18 includes a pair of rollers 110 which are pivotally secured via axles 112 within cut-outs 119a of a support bar 119. The support bar 119 is sized so as to be able to fit within a C-shaped channel 14b of the side rail 14 and through a C-shaped channel 16a (FIG. 11) in the rear support 16. During assembly, the articulating mechanism 18 is inserted through the C-shaped channel 16a in the rear support 16 and a stop member 114 is secured to the support bar 119 via a threaded member 116. The stop member 114 prevents the articulating mechanism 16 from being withdrawn beyond a predetermined point from its respective side rail 14.

With further reference to FIGS. 11 and 14, the support bar 119 includes a slot 120 formed therein within which is disposed a locking bar 122. The locking bar 122 is pivotally mounted at a central aperture 123 by a pivot pin 126 extending through the support bar 18. An elongated, linear slot 124 is also formed in the support bar 18. This slot 124 further includes a relief portion 124a to allow clearance for a cam lobe 128. The slot 124 may vary in length, but in one preferred form is between about six-nine inches.

With reference to FIGS. 14 and 15, a threaded member 132 extends through an opening 134 in a first end 136 of the locking bar 122. The threaded member 132 captures a biasing member 138 within the opening 134. Biasing member 138 serves to provide a constant biasing force which tends to bias the first end 136 of the locking bar 122 upwardly into the position shown in FIG. 15.

With reference to FIGS. 10 and 14, the top frame member 24 includes an axle portion 24a at each end thereof. The axle portions 24a each have attached thereto at their outermost ends one of the cam lobes 128. Thus, the axle portions 24a pivotally support the cargo supporting structure 20 from the articulating mechanisms 18. Importantly, the axle portions 24a also are able to slide within the elongated slots 124 when the cargo supporting structure 20 is moved from the intermediate position of FIG. 2 to the position shown in FIG. 3.

Referring now to FIGS. 12, 13, 14 and 15, when the cargo supporting structure 20 is in the lowered position shown in FIG. 1, the side members 22 are disposed in the position shown in FIG. 12. In this position the cam lobe 128 is engaged in the relief portion 124a, as illustrated in FIG. 14. This allows the cam lobe 128 to lift a second end 140 of the lock bar 122 which causes the first end 136 to project outwardly of the support bar 119. The first end 136 abuts a notch 142 formed in the rear support 16 which prevents the articulating mechanism 18 from moving inadvertently towards and into the support member 16 when the cargo supporting structure 20 is in the lowered position of FIG. 1. Thus, when in the lowered position shown in FIG. 1, the cargo supporting structure 20 is fixedly disposed. Its upper end 20a cannot be pulled outwardly away from the upper supports 16 because of abutting engagement of the stop members 114 with their respective supports 16. Abutting engagement of the first end 136 of each locking bar 122 with the notch 142 of each support 16 prevents the upper end 20a from being pushed in toward the side rails 14. Accordingly, cargo supported on the cross bars 25 of the cargo supporting structure 20 can be supported just as securely with the structure 20 in the lowered position as when the structure 20 is disposed over the roof portion 12a of the vehicle 12.

When the cargo supporting structure 20 is lifted into the intermediate position shown in FIG. 2, the cam lobe 126 rotates in accordance with rotational movement of the top frame member 24 (FIG. 1) into the position shown in FIG. 13. This rotation of the cam lobe 128 allows the spring 138 to bias the first end 136 of the locking bar 122 upwardly into the position shown in FIG. 15. In this position the locking bar 122 is now able to clear the notch 142. Accordingly, the entire articulating mechanism 18 may be urged forwardly (i.e., to the right in the drawings of FIGS. 12–15) through the C-shaped channels 16a in each of the rear supports 16. This unlocking action is further accomplished automatically by simply raising the free end 28 of the cargo supporting structure 20 into the intermediate position shown in FIG. 2.

Once the individual has raised the cargo supporting structure 20 into the position shown in FIG. 2, the entire cargo supporting structure can be pushed forwardly until the structure 20 is positioned over the roof portion 12a of the vehicle 12. During the initial six-nine inches of forward travel, the axle portions 24a slide forwardly within the elongated slots 124 before contacting forward ends 124b of the slots 124. This six-nine inches of "travel" provides the distance necessary to place the pivot axis defined by the axle portions 24a sufficiently behind the vehicle 12 so that the vehicle 12 does not interfere with lowering pivotal movement of the cargo supporting structure 20.

Another important advantage of the articulating mechanisms 18 is that they effectively allow the top frame member 24 to be positioned rearwardly of the pivot axis of the liftgate 12b of the vehicle 12 such that the cargo supporting structure 20 can be lifted with the liftgate 12b without first having to place the structure 20 over the roof portion 12a of the vehicle 12. Thus, access can easily be gained to the rear of the vehicle 12 once the cargo supporting structure 20 and liftgate 12b are both in the raised position.

Referring now to FIGS. 11 and 17, the securing of one of the lower locking assemblies 30 to one of the upper locking assemblies 36 (also shown in FIG. 3) will be described. Each of the upper locking assemblies 36 comprises a housing 146 which is preferably integrally formed with an associated one of the rear supports 16. Within the housing 146 is upstanding structure 148 and a transversely extending latch member 150. When the cargo supporting structure 20 is to be secured over the roof portion 12a of the vehicle 12, it is urged into position over the roof portion 12a such that the lower locking assembly 30 is over, but slightly forwardly, of the upstanding structure 148. The locking assembly 30 can then be lowered into an interior area of the housing 146. As the lower locking assembly 30 is lowered into the interior area of the housing 146, the lip portion 102 of the latch lever 84 contacts an upper edge 150a of the transversely extending latch member 150 and pivots slightly against the biasing force of the spring 96 so as to clear the edge 150a. The lip portion 102 then latches under the latch structure 150. In the position shown in FIG. 17, the lower locking assembly 30 is secured against movement.

Unlocking of the lower locking assembly 30 is accomplished by a user grasping and rotating the rotatable sleeve 60, which causes the latching lever 84 to pivot counterclockwise in the drawing of FIG. 17. While holding the rotatable sleeve 60 in its rotated position against the biasing force of spring 96, the user may then push the entire cargo supporting structure 20 forwardly just slightly before lifting the free end 28 of the structure 20 and then pulling same away from the vehicle 12 into the position shown in FIG. 2. Accordingly, unlatching of the cargo support structure 20 from the position shown in FIG. 3 can be accomplished by the user merely grasping the rotatable sleeve 60 and, from a single position behind the vehicle 12, articulating the actuator bar assembly 26 to clear the upper locking assembly 36. Thus, there is no need for the user to separately unlock each of the lower locking assemblies 30. This significantly adds to the convenience and ease in using the apparatus 10.

From the foregoing description, it will be appreciated that the apparatus 10 of the present invention provides an articulatable article carrier assembly which enables cargo to be carried either in a generally horizontal position over the liftgate of a vehicle, or on top of the vehicle, depending upon the user's preference. The apparatus 10 of the present invention significantly eases the manner with which cargo may be loaded, since the cargo need not be positioned directly on top of the vehicle 12 but rather on the cross bars 25 while the cargo supporting structure 20 is disposed over the liftgate 12b. In this regard, it will be appreciated that one or both of the cross bars 25 could include perpendicularly extending portions which serve to temporarily support cargo which is positioned on the cross bars 25 when the cargo supporting structure 20 is in the lowered position shown in FIG. 1. The apparatus 10 can further be locked and unlocked from the position shown in FIGS. 1–3 with a simple, single movement of the rotatable sleeve 26, which thus serves to significantly enhance the ease with which the cargo supporting structure 20 can be moved between its various positions.

Figure 18:
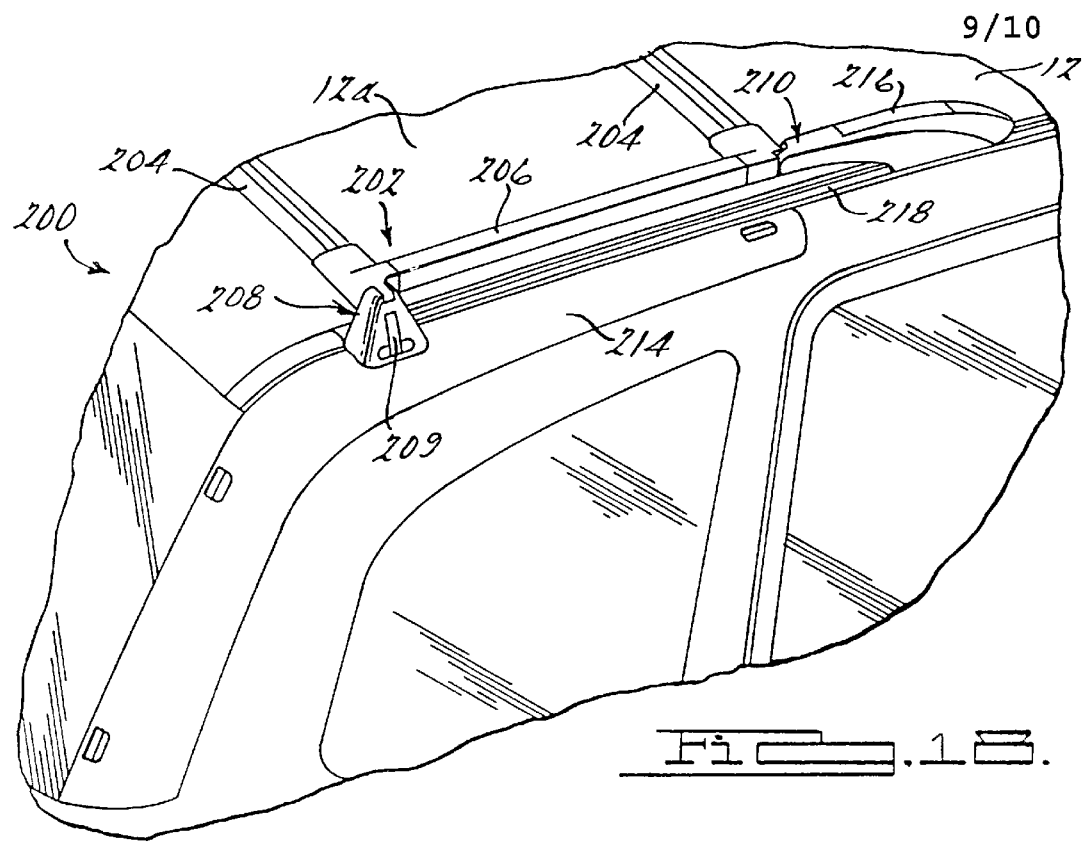
FIG. 18 is a perspective view of an alternative preferred embodiment of the present invention.
Figure 19:
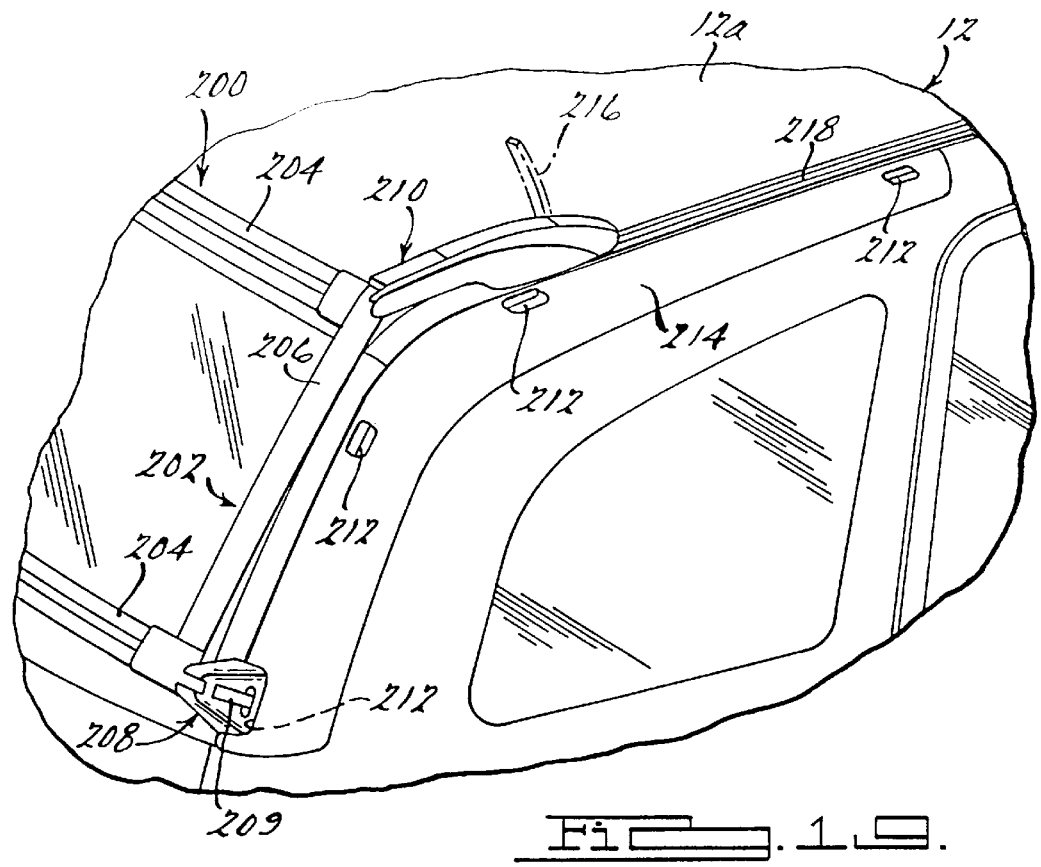
FIG. 19 is a perspective view of the article carrier of FIG. 18 with the cargo supporting structure thereof in a lowered position.

Referring now to FIGS. 18 and 19, an alternative preferred embodiment 200 of the multi-position, articulating, vehicle article carrier apparatus is illustrated. The apparatus 200 includes a cargo supporting structure 202 comprising a pair of cross bars 204 and a pair of side members 206 (only one being visible). With the apparatus 200, however, a pair of rear supports 208 and a pair of front supports 210 are used to support the cargo supporting structure 202 above the outer body surface 12a of the vehicle 12. Each rear support 208 includes a suitable latching structure which can be actuated through opening and closing of a pivoting lever 209 to engage a suitably shaped cavity 212 (FIG. 19) in an outer body surface portion 214 of the vehicle 12. The front supports 210 each include a latching structure therein which can be locked and unlocked via a liftable locking lever 216 (shown in phantom in the lifted position in FIG. 19).

When the apparatus 200 is in the position shown in FIG. 18, the cargo supporting structure 202 is disposed over the roof portion 12a of the vehicle 12. The internal locking structure within the front supports 210 secures the front supports to conventional slats 218 which are fixedly secured to the roof portion 12a of the vehicle 12, and which each include channels which captively hold portions of the front supports 210 to the slats 218. This construction for the slats and the interengagement of the front supports 210 with the slats 218 to permit sliding movement of the front supports 210 along the slats 218 is well known in the art. Patents of the assignee of the present application which disclose suitable constructions for the locking assembly of the front support 210, which could be utilized with little or no modifications, are U.S. Pat. Nos. 4,899,917; 4,972,983; 4,982,886; 5,385,285 and 5,579,970, which are all incorporated by reference herein.

In FIG. 19, the cargo supporting structure 202 is shown disposed over the liftgate 12b of the vehicle 12. The rear supports 208 can be locked at one of a plurality of positions defined by cavities 212.

Figure 20:
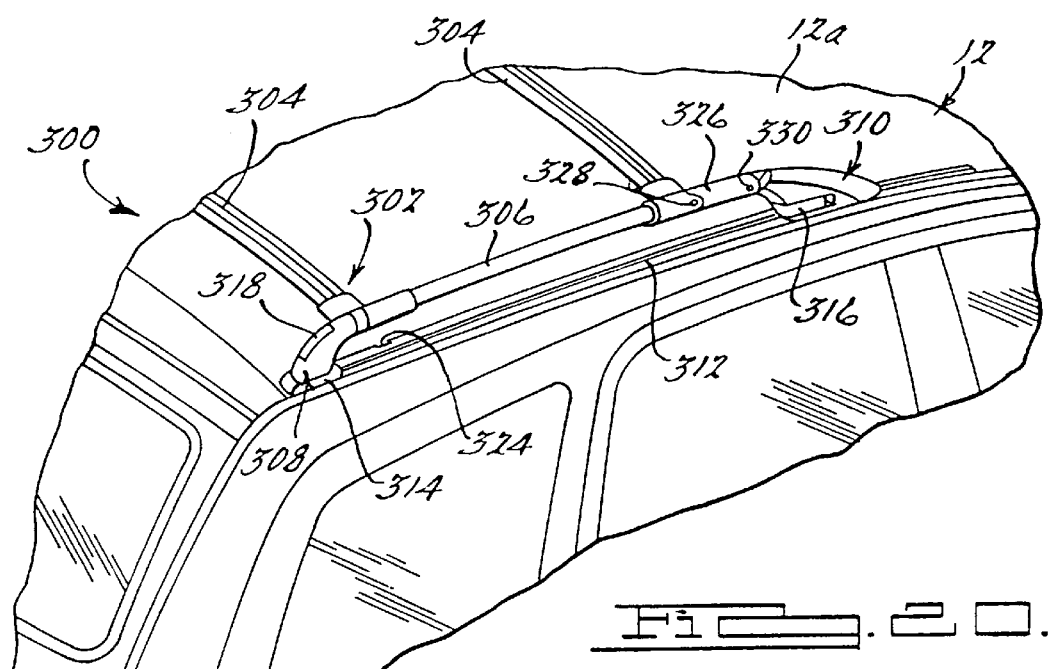
FIG. 20 is a perspective view of another alternative preferred embodiment of the present invention.
Figure 21:
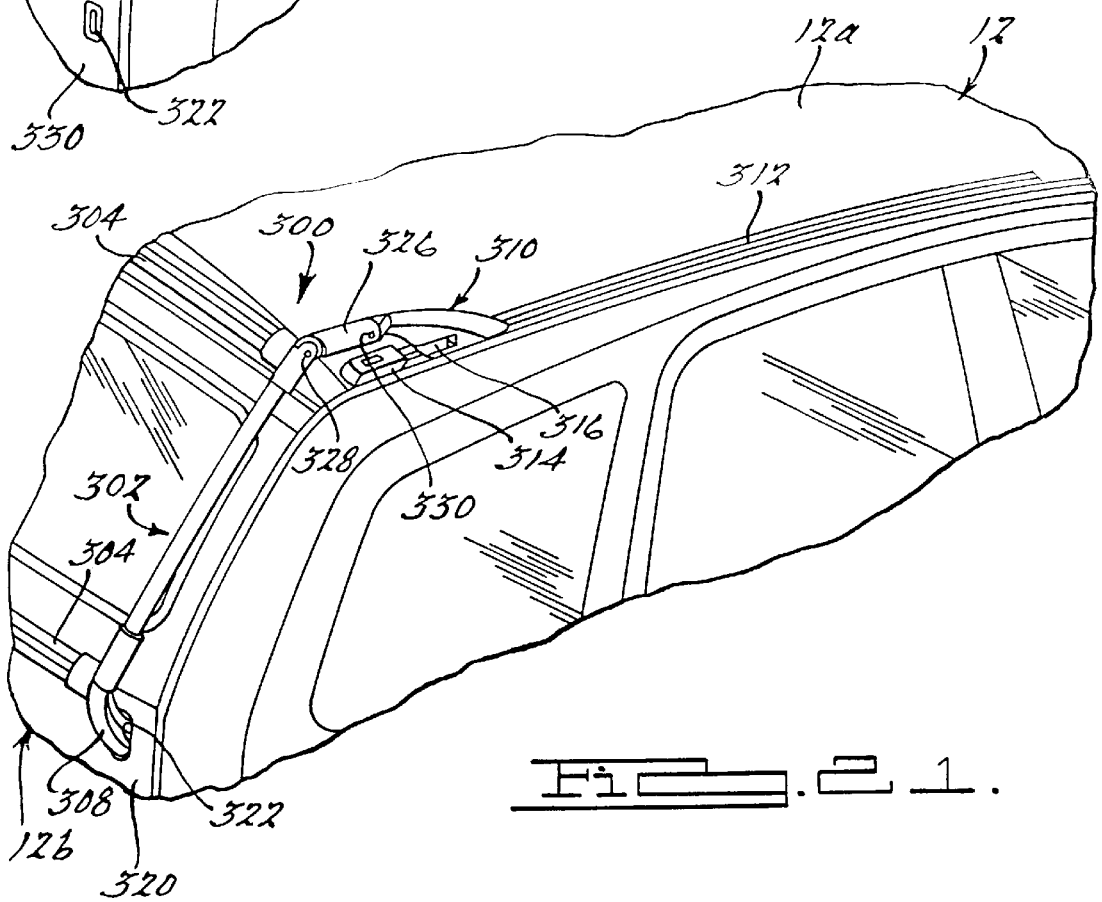
FIG. 21 is a perspective view of the article carrier of FIG. 20 with the cargo supporting structure thereof in the lowered position.

Referring now to FIGS. 20 and 21, a multi-position, articulating, vehicle article carrier 300 in accordance with yet another alternative preferred embodiment of the present invention is shown. The apparatus 300 is similar to the apparatus 200 and includes a cargo supporting structure 302 comprised of a pair of cross bars 304 and a pair of side members 306 (only one being visible). The cargo supporting structure 302 is supported above the roof portion 12a of the vehicle 12 by a pair of rear supports 308 and a pair of front supports 310 (with only one of each support 308 and 310 being visible). The front supports 310 are disposed on conventional slats 312 such that the front supports 310 can be moved slidably along the slats. The slats 312 are fixedly secured to the roof portion 12a of the vehicle 12. Each slat 312 further includes a latching assembly 314 to which one of the rear supports 308 may be releasably secured.

To move the cargo supporting structure 302 from the position shown in FIG. 20 into the position shown in FIG. 21, the user first unlatches the front supports 310 by pulling outwardly on lever portions 316 of each of the front supports 310. This unlocks each front support 310 from its associated slat 312 and allows the front support 310 to be slid along its associated slat 312. Each rear support 308 is also unlatched from its associated latching assembly 314 by lifting a latching lever 318. The cross bar 304 extending between the rear supports 308 can then be lifted off of the latching assemblies 314, and the entire cargo supporting structure 302 pulled rearwardly so as to extend over the liftgate 12b. The rear supports 308 are then latched to suitable latching structures formed in the liftgate 12b at areas 322. The front supports 310 are then latched by closing the levers 316 which causes them to be locked on the slats 312 at the position shown in FIG. 21. If desired, notches 324 (one of which is shown in FIG. 20) could be formed in the slats 312 to define a specific position at which the front supports 312 must be placed in before same can be locked to the slats 312.

The apparatus 300 also provides a coupling member 326 associated with each front support 310 which provides two pivot points 328 and 330. These two points of rotation are needed because the point of rotation about which the liftgate 12b rotates is laterally offset of the point of rotation of the cargo supporting structure 302. This allows the cargo supporting structure 302 to be easily articulated, together with the liftgate 12b, as the liftgate 12b is lifted, and without the need to first unlock the front supports 310 or the rear supports 308. Thus the apparatus 10 can be lifted simultaneously from the position shown in FIG. 21 into an intermediate position, wherein the cargo supporting structure 302 extends generally horizontally outwardly from the roof portion 12a, such as in FIG. 2, before being pushed onto a position over the roof portion 12a, without any binding action occurring at the coupling member 326.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus adapted to be secured to an outer body surface of a vehicle and to permit cargo to be supported thereon over either a substantially horizontally facing rearward portion of the vehicle or a roof portion of the vehicle, said apparatus comprising:

a pair of side rails adapted to be fixedly secured to said roof portion of said vehicle;

a cargo support structure for supporting cargo thereon;

a pair of articulating mechanisms disposed at opposite upper ends of said cargo support structure for pivotally securing an upper end portion of said cargo support structure to said side rails, and for moving along said side rails when said structure is moved from an intermediate position extending generally horizontally outwardly from a roof portion of said vehicle to a stored position in which said structure is disposed over said roof portion;

said articulating mechanisms operating to allow a limited degree of additional linear sliding movement between said cargo support structure and said articulating mechanisms when said structure is moved from said stored position toward said intermediate position, to thereby allow said structure to be pivoted into a lowered position from said intermediate position without said upper end of said structure interfering with any portion of said vehicle while pivoting down into said lowered position; and at least one of said articulating mechanisms including an actuated member actuated by movement of said cargo support structure from said lowered position to said intermediate position for preventing said cargo support structure from being moved toward said stored position unless said cargo support structure is first placed in said intermediate position.

2. The apparatus of claim 1, wherein said cargo support structure comprises a camming member, and wherein said actuated member of said at least one articulating mechanism comprises a pivotally mounted lock bar, said camming member operating to move said lock bar out of abutting engagement with a portion of one of said side rails when said cargo support structure is lifted from said lowered position into said intermediate position.

3. The apparatus of claim 1, wherein said cargo support structure includes at least one lower locking assembly for enabling said cargo support structure to be secured to a portion of one of said side rails when in said stored position.

4. The apparatus of claim 1, wherein:

said cargo support structure includes at least one lower locking assembly; and wherein said apparatus further includes a latching assembly adapted to be disposed on or near a bumper of said vehicle;

said latching assembly operating to engage with said lower locking assembly when said cargo support structure is in said lowered position to thereby maintain said cargo support structure securely in said lowered position.

5. The apparatus of claim 1, further comprising:

an upper locking assembly associated with one of said side rails; and a lower locking assembly associated with said cargo support structure;

said upper and lower locking assemblies cooperating to maintain said cargo support structure in said stored position when said cargo support structure is in said stored position.

6. A vehicle article carrier apparatus adapted to be secured to an outer body surface of a vehicle and to permit cargo to be supported thereon over either a liftgate portion of the vehicle or over a roof portion of the vehicle, said apparatus comprising:

a pair of side rails adapted to be fixedly secured to said roof portion of said vehicle; a cargo support structure for supporting said cargo thereon, said cargo support structure having portions engaging said side rails and moveable there along between a first position, wherein said support structure is disposed over said liftgate, and a second position wherein said support structure is disposed on said vehicle roof portion and supported substantially entirely by said side rails; and wherein said cargo support structure includes an articulating mechanism for allowing pivoting movement of said support structure from a first end thereof to enable said cargo support structure to be pivoted between said first position and an intermediate position substantially parallel to said side rails, prior to urging said cargo support structure into said second position;

wherein said articulating mechanism includes an assembly for preventing said first end of said cargo support structure from being urged toward said second position unless and until said cargo support structure is articulated into said intermediate position; and wherein said articulating mechanism includes an actuated member actuated by movement of said cargo support structure from said lowered position to said intermediate position for preventing said cargo support structure from being moved toward said second position unless said cargo supporting structure is first placed in said intermediate portion.

7. The apparatus of claim 6, wherein said articulating mechanism comprises:

a support bar adapted to slide along an associated one of said side rails; and said actuated member comprising a locking bar, said locking bar being pivotally secured to said support bar and movable between a locked position, in which said locking bar is adapted to engage a portion of a support foot supporting said side rail, to thereby prevent said cargo support structure from being urged from said first position toward said second position, and an unlocked position in which said locking bar is pivoted out of engagement with said support foot, thereby enabling said cargo support structure to be urged toward said second position along said side rails.

8. The apparatus of claim 6, wherein said articulating mechanism comprises:

a support bar adapted to slide along an associated one of said side rails;

said actuated member comprising a locking bar, said locking bar being pivotally secured to said support bar and movable between a locked position, in which said locking bar is adapted to engage a portion of said support foot supporting said side rail, to thereby prevent said cargo support structure from being urged toward said second position, and an unlocked position in which said locking bar is pivoted out of engagement with said support foot, thereby enabling said cargo support structure to be urged toward said second position along said side rails; and wherein said cargo support structure includes a camming member and said locking bar includes a slot for housing said camming member, said camming member operating to pivot said lock bar automatically when said cargo support structure is moved into said intermediate position.

9. The apparatus of claim 6, further comprising a latching assembly adapted to be associated with a bumper of said vehicle for engaging with a second end of said cargo support structure and securing said second end of said cargo support structure to said bumper.

10. The apparatus of claim 6, further comprising a lower locking assembly disposed at a second end of said cargo support structure for engaging with a portion of said vehicle when said cargo support structure is disposed in said first position.

11. The apparatus of claim 8, wherein said articulating mechanism includes at least one roller adapted to engage an associated one of said side rails and to roll therealong when said cargo support structure is urged into said second position.

12. The apparatus of claim 6, wherein at least one of said side rails includes an upper locking support assembly adapted to be fixedly disposed on said roof portion of said vehicle for engaging with a second end of said cargo support structure after said cargo support structure is urged into said second position, to thereby secure said cargo support structure on said roof portion.

13. The apparatus of claim 6, further comprising:
a lower locking mechanism adapted to be operably associated with a bumper of said vehicle; and
wherein said cargo support structure includes a manually rotatable actuator bar operably associated with at least one lower locking assembly, wherein said lower locking assembly is disposed at a second end of said cargo support structure; and
said actuator bar operating to disengage said lower locking assembly from said lower locking mechanism when grasped and rotated by a user while said cargo support structure is in said first position, to thereby allow said cargo support structure to be lifted into said intermediate position by said user.

14. A vehicle article carrier apparatus adapted to be secured to an outer body surface of a vehicle and to permit cargo to be supported thereon over either a liftgate portion of the vehicle or over a roof portion of the vehicle, said apparatus comprising:
a pair of side rails adapted to be fixedly secured to said roof portion of said vehicle;
a cargo support structure for supporting said cargo thereon;
said cargo support structure including an articulating mechanism coupled to one of said side rails for allowing pivoting movement of said support structure from a first end thereof to enable said cargo support structure to be pivoted between a first position, overlaying a liftgate of said vehicle, and an intermediate position substantially parallel to said side rails, prior to urging said cargo support structure into a second position overlaying said roof portion, and
said articulating mechanism preventing said first end of said cargo supporting structure from being urged toward said second position unless and until said cargo supporting structure is articulated into said intermediate position, whereupon said articulating mechanism permits said cargo support structure to be urged along said side rails such that said cargo support structure can be moved into said second position;
an upper locking assembly adapted to be fixedly disposed on said roof portion of said vehicle, for engaging with a second end portion of said cargo support structure to maintain said cargo support structure disposed over said roof portion after said cargo support structure is urged into said second position; and
a latching assembly adapted to be associated with a portion of said vehicle adjacent a bumper of said vehicle for engaging with said second end of said cargo support structure when said cargo support structure is disposed in said first position, to maintain said cargo support structure in said first position.

15. The apparatus of claim 14, wherein said articulating mechanism comprises:
a support bar having at least one roller adapted to move along an associated one of said side rails; and
a lock bar, said lock bar being pivotally secured to said support bar and movable between a locked position in which said lock bar is adapted to engage a portion of a rear support supporting said one side rail, to thereby prevent said cargo support structure from being urged toward said first position, and an unlocked position in which said lock bar is pivoted out of engagement with said rear support, thereby enabling said cargo support structure to be urged toward said second position along said side rails.

16. The apparatus of claim 14, wherein said articulating mechanism comprises:
a support bar adapted to move along an associated one of said side rails;
a lock bar, said lock bar being pivotally secured to said support bar and movable between a locked position in which said lock bar is adapted to engage a portion of a rear support supporting said one side rail, to thereby prevent said cargo support structure from being urged toward said first position, and an unlocked position in which said lock bar is pivoted out of engagement with said rear support as said cargo support structure is lifted from said first position to said intermediate position, thereby enabling said cargo support structure to be urged along said side rails toward said second position; and
wherein said cargo support structure includes a camming member and said lock bar is in contact with said camming member, said camming member operating to pivot said lock bar automatically when said cargo support structure is moved between said first position and said intermediate position.

17. The apparatus of claim 16, wherein:
said side rails each include a channel; and
wherein support bar includes at least one roller adapted to engage an associated one of said side rails and to roll therealong when said cargo support structure is urged into said second position.

18. The apparatus of claim 14, wherein:
said latching assembly is operably associated with a bumper of said vehicle:
wherein said cargo support structure includes a manually rotatable actuator bar operably associated with a lower locking assembly disposed on said free end, to unlock said lower locking assembly; and
said actuator bar operating to disengage from said latching assembly when grasped and rotated by a user while said cargo support structure is in said first position, to thereby allow said cargo support structure to be lifted into said intermediate position by said user.

19. The apparatus of claim 15, wherein said cargo support structure comprises a pair of side members, one transversely extending top frame bar member coupled at its opposite ends to said side members at said first end of said cargo support structure; and
an actuator bar extending transversely between said side members at said free end of said cargo support structure;
said actuator bar being manually rotatable and having a camming member; and
said lock bar having a cam follower surface in contact with said camming member such that said camming member causes pivoting movement of said lock bar when said cargo support structure is lifted from said first position into said intermediate position.

20. A vehicle article carrier apparatus adapted to be secured to an outer body surface of a vehicle and to permit cargo to be supported thereon over either a liftgate portion of the vehicle or over a roof portion of the vehicle, said apparatus comprising:
a pair of side rails adapted to be fixedly secured to said roof portion of said vehicle;

a cargo support structure for supporting said cargo thereon, said cargo support structure being supported by said side rails moveable there along between a first position, wherein said support structure is disposed over said liftgate, and a second position wherein said support structure is disposed on said vehicle roof portion and supported substantially entirely by said side rails;

said cargo support structure including an articulating mechanism for allowing pivoting movement of said support structure from a first end thereof to enable said cargo support structure to be pivoted between said first position, and an intermediate position substantially parallel to said side rails, prior to urging said cargo support structure into said second position, and said articulating mechanism including a support bar for engaging with an associated one of said side rails and enabling linear movement of said cargo support structure along said associated side rail, a lock bar pivotally coupled to said support bar, a camming member fixedly disposed at said first end of said cargo support structure, and a cam follower surface formed on said lock bar;

said lock bar preventing said first end of said cargo supporting structure from being urged toward said second position unless said cargo supporting structure is articulated into said intermediate position, whereupon rotational movement of said camming member causes pivoting movement of said lock bar out of engagement with said associated side rail to permit said support bars to be urged along said side rails such that said cargo support structure can be moved into said second position;

an upper locking assembly adapted to be fixedly disposed on said roof portion of said vehicle for engaging with a lower locking assembly of said cargo support structure to maintain said cargo support structure disposed over said roof portion after said cargo support structure is urged into said second position;

a latching support assembly adapted to be associated with a portion of said vehicle adjacent a lower edge of said liftgate for engaging with said lower locking assembly of said cargo support structure when said cargo support structure is disposed in said first position, to maintain said cargo support structure in said first position.

21. The apparatus of claim 20, wherein said latching assembly is adapted to be disposed in a bumper of said vehicle.

22. The apparatus of claim 21, further comprising:

a manually graspable and rotatable actuator bar disposed on said cargo support structure adjacent said free end of said cargo support structure;

a camming member operably associated with said actuator bar and said lower locking assembly; and wherein said latching assembly is operable to engage with said lower locking assembly when said cargo support structure is urged into said first position, and is releasable therefrom by manually rotating said actuator bar and then lifting said free end of said cargo support structure toward said intermediate position.

23. A vehicle article carrier apparatus adapted to be secured to an outer body surface of a vehicle and to permit cargo to be supported thereon over either a substantially horizontally facing rearward portion of the vehicle or a roof portion of the vehicle, said apparatus comprising:

a pair of side rails adapted to be secured to said roof portion;

a cargo support structure operably associated with said side rails so as to be supported at an upper end thereof pivotally from said side rails, said cargo support structure being movable from a first position along a rear area of said vehicle, and pivotally into an intermediate position extending substantially horizontally outwardly from said roof portion, and from said intermediate position generally linearly into a second position wherein said cargo support structure is disposed over said roof portion;

a latching assembly adapted to be disposed on said vehicle on or near a bumper of said vehicle and operable to lockably engage with a portion of said cargo support structure when said structure is in said first position;

said cargo support structure including an actuator bar assembly, said actuator bar assembly having an actuating component being rotatable by grasping with one hand of a user, to thereby enable said cargo support structure to be unlocked from said latching assembly through a single rotational movement via one hand of said user.

24. The apparatus of claim 23, further comprising an upper locking assembly associated with one of said side rails and operable to engage with said cargo support structure when said structure is moved into said second position.

25. The apparatus of claim 23, wherein said cargo support structure includes a pair of lower locking assemblies and a pair of said latching assemblies, and wherein said lower locking assemblies are adapted to engage with said latching assemblies simultaneously when said cargo support structure is moved into said first position from said intermediate position.

26. The apparatus of claim 23, wherein:

said cargo support structure comprises a pair of lower locking assemblies;

wherein said apparatus includes a pair of said latching assemblies; and said lower locking assemblies operating to engage simultaneously with said latching assemblies when said cargo support structure is lowered from said intermediate position into said first position.

27. A method of supporting cargo on a vehicle in either a first position along side said vehicle or a second position over a roof of said vehicle, the method comprising the steps of:

disposing a pair of side rails on said roof portion;

disposing an articulating assembly on each of said side rails, wherein each said articulating assembly allows for rolling movement along its respective said side rail;

securing a cargo support structure pivotally to said articulating assemblies;

using a lower locking assembly to secure said cargo support structure along side said vehicle when said cargo support structure is in said first position;

using an upper locking assembly to secure said cargo support structure over said roof portion when said cargo support structure is in said second position; and using a manually graspable and rotatable actuator rod assembly associated with said cargo support structure to release said cargo support structure from either of said upper or lower locking assemblies through a rotational movement of a portion of said actuator rod assembly.

* * * * *